United States Patent
Flottorp et al.

(10) Patent No.: US 11,583,936 B2
(45) Date of Patent: Feb. 21, 2023

(54) CUTTING TOOL PART ASSEMBLY

(71) Applicant: SANDVIK INTELLECTUAL PROPERTY AB, Sandviken (SE)

(72) Inventors: Kaja Marie Flottorp, Trondheim (NO); Reidar Hovtun, Borsa (NO)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 218 days.

(21) Appl. No.: 16/647,010

(22) PCT Filed: Sep. 4, 2018

(86) PCT No.: PCT/EP2018/073732
§ 371 (c)(1),
(2) Date: Mar. 12, 2020

(87) PCT Pub. No.: WO2019/052855
PCT Pub. Date: Mar. 21, 2019

(65) Prior Publication Data
US 2020/0254530 A1    Aug. 13, 2020

(30) Foreign Application Priority Data
Sep. 15, 2017 (EP) .................................. 17191429

(51) Int. Cl.
*B23B 27/16* (2006.01)
*B23B 29/04* (2006.01)

(52) U.S. Cl.
CPC ................................ *B23B 27/1611* (2013.01)

(58) Field of Classification Search
CPC ........ B23B 2210/08; B23B 2231/0204; B23B 2240/36; B23B 2270/08; B23B 2270/58; B23B 27/1611; B23B 29/046; B23B 2251/02; B23C 5/26; B23C 2210/02; B23C 2240/24; B23C 9/005
See application file for complete search history.

(56) References Cited

U.S. PATENT DOCUMENTS

| 3,859,699 | A | * | 1/1975 | Lindskog | B23B 29/03 407/120 |
| 4,102,594 | A | * | 7/1978 | Kress | B23D 77/048 408/197 |
| 5,193,954 | A | | 3/1993 | Hunt | |
| 5,555,784 | A | | 9/1996 | Muendlein et al. | |
| 5,688,080 | A | * | 11/1997 | Hedlund | B23B 27/04 407/101 |
| 8,479,622 | B2 | * | 7/2013 | Hecht | B23B 27/007 408/239 R |

(Continued)

FOREIGN PATENT DOCUMENTS

| DE | 2907994 A1 * | 11/1979 | ............... B23C 5/26 |
| DE | 102012214923 A1 | 9/2013 | |

(Continued)

*Primary Examiner* — Nicole N Ramos
(74) *Attorney, Agent, or Firm* — Corinne R. Gorski

(57) ABSTRACT

A cutting head attachment assembly for a cutting tool includes a body forming an axially forward part of the cutting tool attachable to a cutting head via a clamping element and a fixation element. A guide surface provided at the body or cutting head extends in both a radial and an axial direction to support movement of the clamping element in both the radial and axial directions via actuation of the fixation element to force and clamp together axially the head and body.

23 Claims, 12 Drawing Sheets

(56) References Cited

U.S. PATENT DOCUMENTS

| | | | |
|---|---|---|---|
| 2005/0268760 A1* | 12/2005 | Erickson | B23B 29/046 82/160 |
| 2009/0283975 A1* | 11/2009 | Kretzschmann | B23B 31/06 408/56 |
| 2010/0254774 A1 | 10/2010 | Hecht | |
| 2011/0262232 A1* | 10/2011 | Chen | B23C 5/109 407/46 |
| 2012/0141220 A1* | 6/2012 | Chen | B23B 31/11 409/136 |
| 2012/0170983 A1* | 7/2012 | Park | B23B 27/007 407/66 |
| 2013/0034393 A1* | 2/2013 | Hecht | B23B 29/046 407/101 |
| 2015/0330423 A1* | 11/2015 | Neiman | F16B 1/00 411/81 |
| 2015/0330434 A1* | 11/2015 | Stjernstedt | F16D 1/0888 403/320 |
| 2017/0066066 A1* | 3/2017 | Serbutovsky | B23C 5/2295 |
| 2018/0009042 A1* | 1/2018 | Chen | B23B 31/11 |
| 2019/0210125 A1* | 7/2019 | Ning | B23C 5/006 |

FOREIGN PATENT DOCUMENTS

| | | | | |
|---|---|---|---|---|
| DE | 102014008778 A1 | | 12/2015 | |
| DE | 102017118501 A1 | * | 2/2019 | ............ B23B 27/10 |
| EP | 3782750 A1 | * | 2/2021 | ........ B23B 27/1659 |
| GB | 513479 A | * | 10/1939 | .......... B23D 77/006 |
| GB | 2164276 A | * | 3/1986 | ........ B23B 31/1077 |
| JP | S61159103 U | | 10/1986 | |
| SU | 1777066 A1 | | 9/1985 | |
| WO | 99/11411 A | | 3/1999 | |
| WO | 2013018087 A2 | | 2/2013 | |

* cited by examiner

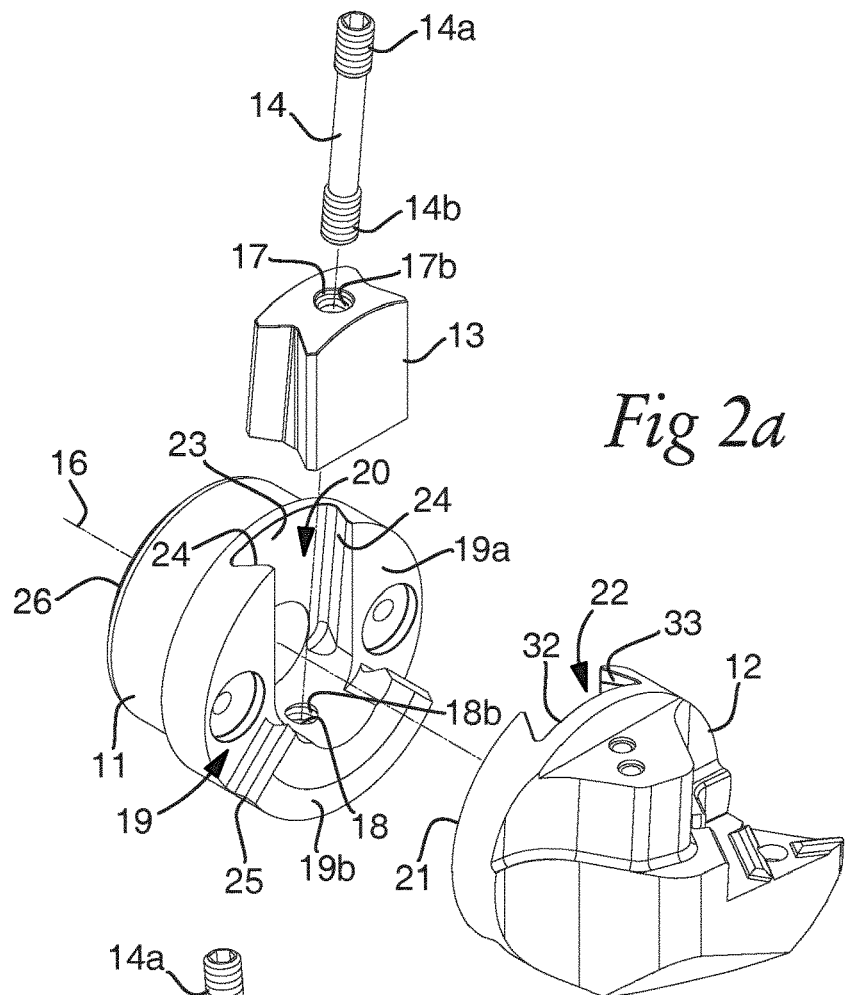
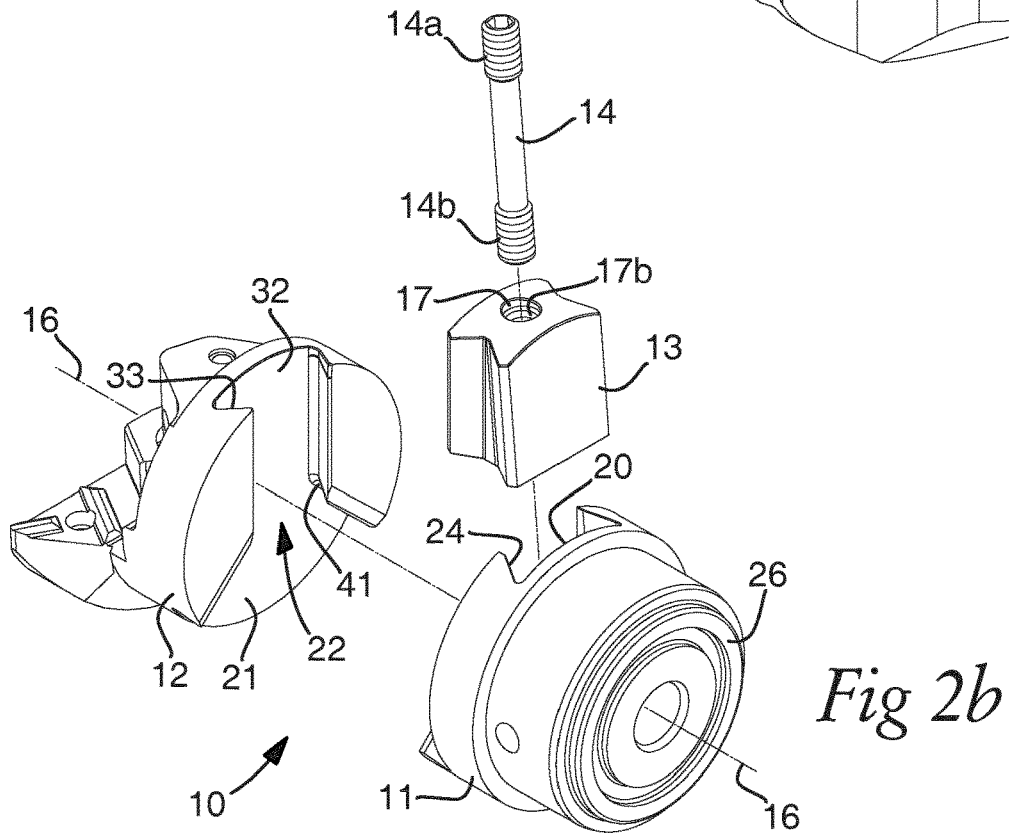

CUTTING TOOL PART ASSEMBLY

RELATED APPLICATION DATA

This application is a § 371 National Stage Application of PCT International Application No. PCT/EP2018/073732 filed Sep. 4, 2018 claiming priority to EP 17191429.4 filed Sep. 15, 2017.

FIELD OF INVENTION

The present invention relates to a cutting tool part assembly and in particular, although not exclusively, to an assembly having a clamping element to axially clamp a first body and a second body forming part of a cutting tool.

BACKGROUND ART

Cutting tools, for example rotary cutting tools, are used extensively for grooving and boring a workpiece. Such tools typically comprise hardened cutting inserts removably mounted at a cutting head that is, in turn, detachably mounted to an axially forwardmost part of a cutting tool body. As the body and workpiece are moved relative each other, for example the body is rotated about its axis or the work piece is rotated about its axis, the cutting insert engages into the workpiece to create the desired groove, bore, shoulder profile etc., as will be appreciated.

Long tool exchange times are undesirable with respect to machine down time and productivity efficiency. Accordingly, the cutting head/tool body interface is required to be relatively easy to assembly and dimensionally accurate so as to appropriately and effectively transfer loading forces during cutting. WO 2013/018087 describes a modular cutting tool holder and clamping mechanism. In particular, an eccentric screw is adapted to engage a follower body that extends axially intermediate and into an axially forward cutting head and an axially rearward tool body. By rotation of the screw, and via the follower body, the head and tool body are clamped together axially.

However, existing clamping mechanisms are typically intricate to assemble and manipulate to achieve the desired coupling. Accordingly, tool exchange times are still excessive and complicated. What is required is a cutting tool part assembly and clamping mechanism that addresses such problems.

SUMMARY OF THE INVENTION

It is an objective of the present invention to provide a cutting part clamping assembly that is quick and convenient to assemble and tighten to a fully clamped position. It is a further specific objective to provide a cutting tool part assembly, clamping mechanism and assembly and disassembly procedure that maintains to a minimum the number of component parts, provides a mechanically robust and reliable couple joint and is furthermore quick and convenient to implement.

The objectives are achieved via a clamping assembly in which a first body and a second body may be clamped axially together via a clamping element and a fixation element in which the clamping element, via actuation of the fixation element, is adapted to move radially and axially with respect to the bodies being clamped and by abutment contact between appropriate surfaces, pull together axially the bodies for coupling.

A coupling mechanism is provided that is quick and convenient to implement via in part, at least one channel extending radially within one or more of the tool body parts to be coupled to at least partially receive the clamping element. The channel comprises a base surface (alternatively termed a guide surface) that is configured specifically to provide axially forward or rearward movement of the clamping element by actuation of the fixation element. That is, as the clamping element (positioned to bridge the interface of the bodies to be clamped) is moved radially inward towards an axial centre of at least one of the bodies, the clamping element is advanced axially which in turn increases the frictional contact between at least one respective abutment surface (at each body) and respective clamping surfaces (at the clamping element) thereby forcing/pulling the tool bodies axially together. Preferably, the axial displacement of the clamping element by actuation of the fixation element, and the associated frictional contact between the surfaces of the clamping element and the bodies being coupled, provides elastic deformation of the clamping element and an associated increase in the strength and reliability of the couple during cutting. Preferably, the coupling mechanism requires little axial space so that the features of the coupling mechanism extend only a short axial length in the bodies. This is especially advantageous for clamping together tool bodies that comprises dampers.

The present arrangement, comprising a minimum number of component parts and being relatively simple in construction, provides a convenient arrangement for assembly and a clamping mechanism that may be implemented quickly for clamping and unclamping via a single actuation of the fixation element. Preferably, the fixation element is actuated by rotation using for example a rotatable tool.

According to a first aspect of the present invention there is provided a cutting tool part assembly for a cutting tool, the assembly comprising: a first body to form an axially forward part of a cutting tool; a clamping element movably mounted relative to the first body to a clamping position to releasably clamp a second body at the first body: a fixation element to releasably lock the clamping element in the clamping position; characterised in that: the first body comprises an axially forward facing contact face to mate with a corresponding axially rearward facing contact face of the second body, and at least one abutment face being at least partially rearward facing; the clamping element comprising at least one first clamp face being at least partially forward facing to mate with the abutment face and at least one second clamp face being at least partially axially rearward facing to mate with a portion of the second body; and at least one guide surface extending in a radial direction and aligned oblique to a plane perpendicular to a longitudinal axis of the first body so as to also extend in an axial direction of the first body, the guide surface supporting movement of the clamping element in a radial and an axial direction via an actuation of the fixation element to force and clamp together axially the first body and the second body.

Optionally, the guide surface is located at the first body. Optionally, the guide surface may be located at the second body. The guide surface is specifically adapted with the clamping element to support radial and axial sliding of the clamping element in an axial direction away from the interface between the two bodies. The guide surface may be planar, curved, ribbed or otherwise profiled as desired to achieve the desired radial and axial movement. Preferably, the guide surface is provided at the first body which may be a forwardmost part of a cutting tool body.

Preferably, the first body comprises a channel having a length extending radially and a depth recessed axially from the contact face, the guide surface defining at least a part of the channel wherein the clamping element is capable of being at least partially accommodated and being radially slidable within the channel. Preferably, the guide surface represents a base surface of the channel, the channel being further defined by opposed side faces. More preferably, the at least one abutment face comprises at least portions of the opposed side faces. In an axial plane of the body (aligned perpendicular to a radial length of the channel), the channel may comprise a trapezoidal cross sectional profile (corresponding to a fish-tail or dove-tail profile). Such a configuration provides the sloping or inclined abutment faces (relative to the longitudinal axis) that are axially rearward facing to frictionally engage and lock against the forward facing clamping faces of the clamping element. Accordingly, a strong and reliable axial clamp is achieved between the two bodies to be coupled.

Preferably, at least portions of the respective contact faces extend in a plane generally perpendicular to the longitudinal axis of the first body and the abutment face and the first and second clamp faces are aligned oblique to the contact faces. The respective contact faces of the two bodies may be configured to be brought together in complete touching, partial touching or near touching contact with one another. Importantly, the abutment faces at the bodies and the clamping faces of the clamping element provide the primary axial locking. Preferably, peripheral (radially outer) regions of the contact faces of the bodies may be forced together to further stabilise the clamping action to be beneficial for stabilisation of the assembly during cutting. Optionally, at least one or some of the contact faces may be profiled and may comprise surface scoring, ridges, ribs, roughening and the like to increase the frictional contact and assist with the axial and/or radial lock. Optionally, at least some of the abutment and clamp faces may be profiled (surface scoring, ridges, ribs, roughening and the like) to assist frictional engagement and the axial and/or radial lock.

Optionally, in an axial plane extending through the first body and bisecting the longitudinal axis, the guide surface may extend in a radial direction at an angle relative to the plane perpendicular to the longitudinal axis of the first body in the range 0.5° to 10°; 1° to 9°; 1° to 8°; 1° to 7°; 3° to 7°; or 4° to 6°. This angle configuration provides the desired axial clamping force to couple the first and second bodies via the desired axial displacement of the clamping element along the sloping guide surface.

Preferably, in an axial plane extending through the first body and bisecting the longitudinal axis, each of the abutment face and the first clamp face may be aligned at an angle in a range 10° to 50°; 15° to 45°; 20° to 40°; 25° to 35°; or 27° to 33° relative to said axial plane. This alignment provides the desired transmission of loading forces between one or both bodies and the clamping element to achieve the desired axial and radial coupling strength. The angular alignment of the abutment and clamping faces also facilitates initial assembly of the components and avoids misalignment. This, together with the straightforward radial and axial adjustment of the clamping element, provides a desired quick and convenient assembly and disassembly procedure.

Preferably, an axial plane extending through the first body and bisecting the longitudinal axis, an angle defined between the first and second clamp faces is in a range 100° to 140°; 105° to 135°; 110° to 130°; or 115° to 125°. This configuration is in addition to the angular alignment of the abutment faces provides the desired management of force between the bodies being coupled and the clamping element so as to achieve the desired axial and radial lock.

Preferably, the fixation element comprises a pin, rod, axel, shaft or screw adjustably mountable at the first body or the second body. Preferably, the fixation element comprises a screw having at least one threaded end. Optionally, the screw may comprise threaded sections at each axial end. Preferably, the thread at one end is a left handed and the thread at the opposite end is a right handed. This is advantageous to drive the screw into the fixation element and the body via a single axial rotation of the screw.

Optionally, the fixation element is coupled to the clamping element such that a positional adjustment of the fixation element relative to the first body and/or the second body provides the radial and axial movement of the clamping element along the guide surface. This arrangement provides a quick and convenient mechanism for clamping the bodies together.

According to some embodiments, the fixation element is elongate having a length extending parallel, generally parallel or nearly parallel with a length of the clamping element that extends generally radially at the first body and/or the second body.

Optionally, in some embodiments the fixation element is elongate having a length extending perpendicular, generally perpendicular, nearly perpendicular or transverse to a length of the clamping element that extends generally radially at the first body and/or the second body.

Preferably, a length of the fixation element is aligned parallel, generally parallel or nearly parallel with the guide surface extending in the radial direction. Such an arrangement contributes to the simple, quick and convenient coupling mechanism via minimising component parts and facilitating movement of the clamping element in the radial and axial by a single rotation of the fixation element.

Optionally, the clamping element comprises a bore to at least partially accommodate a first portion of the fixation element. More preferably, the first body comprises a radially extending bore to at least partially accommodate a second portion of the fixation element. In a preferred embodiment, the fixation element comprises first threads at or towards a first axial end to mate and cooperate with first threads formed at the bore of the clamping element, and second threads formed at or towards a second axial end to mate and cooperate with second threads formed at the bore of the first body. Optionally, according to further embodiments, the clamping element may comprise a groove, slot, cavity or recess capable of at least partially accommodating a portion of the fixation element. Optionally, the fixation element when implemented with a slotted clamping element may comprise an eccentric central section capable of being displaced eccentrically (relative to a longitudinal axis of the fixation element) so as to abut against the clamping element (via the slot) and accordingly provide the radial and axial movement (via the slopping guide surface).

Optionally, the clamping element may be generally wedge-shaped having a thickness that increases from a first end to a second end, where the first end is intended to be a peripheral outermost end and the second end is intended to be the radially innermost end positioned at or towards the axial centre of the first and/or second bodies. Optionally, the clamping element may comprise ribs or ridges extending lengthwise in a direction between the first end and the second end, where the abutments faces are provided at regions or faces of the ribs or ridges. Optionally, the ribs or ridges extend substantially the full length of the clamping element.

Optionally, the clamping element may comprise a H- or I-cross sectional shape profile. Accordingly, the first and second bodies are adapted to comprise complimentary shaped regions to engage the clamping element. Where the first and second bodies comprise respective channels, the side wall faces, the base face and/or the respective abutment faces are aligned and orientated so as to engage the axially forward and rearward facing clamping faces of the clamping element corresponding to specific regions of the H- or I-shape profiles.

Optionally, the contact faces of the first and/or second bodies may comprise surface profiling in the form of ribs, grooves, channels, dimples or other projections or surface roughening to increase the surface area contact between the respective contact faces.

Optionally, the surface profiling is provided at the lateral sides that flank the respective channels at the first and/or second bodies. Optionally, the surface profiling may be provided at the respective contact faces to extend at, from and/or around the radially inner end of the channel that receives the clamping element. Preferably, the surface profiling is provided at a peripheral region of the contact face at the first and/or second body. Optionally, the surface profiling may extend radially towards the axial centre of the contact face at the first and/or second body.

Optionally, the assembly may further comprise a second body, the second body positioned axially forward of the first body and comprising at least one abutment face being at least partially axially forward facing to mate with the second clamp face being at least partially axially rearward facing. Optionally, the second body may comprise a cutting head. The cutting head can be a metal cutting head, such as a milling, drilling or turning cutting head. Optionally, the second body may comprise an adaptor for positioning axially between a cutting head and the first body. Optionally, the second body may comprise any tool part that is required to be coupled to a first tool part forming part of a cutting tool. Optionally, the second body may comprise a cutting head and the first body may comprise an adaptor or other cutting tool part, the adaptor or tool part mountable to an axially forward region of a cutting tool. Optionally, the first body may comprise a damper.

BRIEF DESCRIPTION OF DRAWINGS

A specific implementation of the present invention will now be described, by way of example only, and with reference to the accompanying drawings in which:

FIG. 2*a* is a first exploded perspective view of the assembly of FIG. 1;

FIG. 2*b* is a further exploded perspective view of the assembly of FIG. 1;

DETAILED DESCRIPTION OF PREFERRED EMBODIMENT OF THE INVENTION

Figure 1:
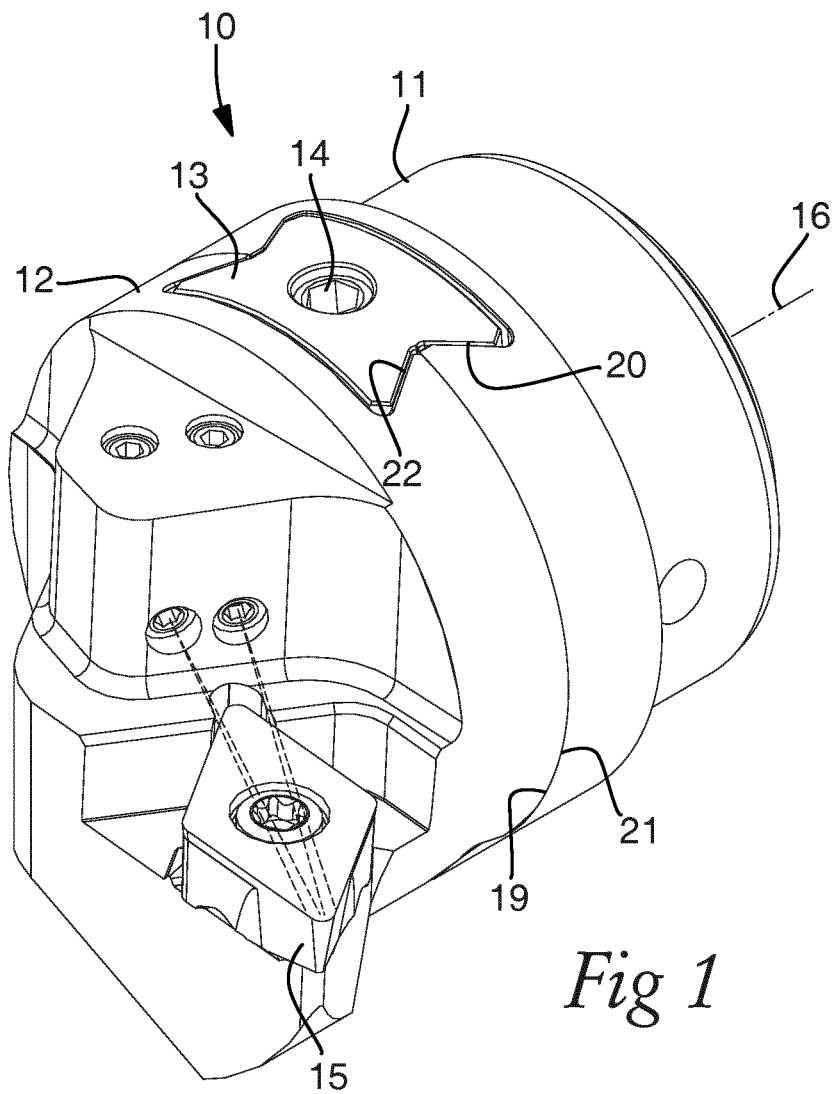
FIG. 1 is a perspective view of a cutting head assembly of a cutting tool according to a specific implementation of the present invention.

Referring to FIGS. 1, 2*a* and 2*b*, a cutting tool comprises an axially forwardmost body 11 to mount a cutting head 12 that in turn mounts a cutting insert 15. Body 11 and head 12 are clamped axially, relative to a longitudinal axis 16 that extends through head 12 and body 11, via a generally block- or wedge-shaped clamping element 13. Clamping element 13 is, in turn, secured removably in position at the tool assembly 10 via a fixation element 14. Clamping element 13 is positioned to bridge (axially overlap) an axially forward portion of body 11 and an axially rearward portion of cutting head 12 so as to axially and radially couple together body 11 and head 12. In the fully clamped and assembled configuration of FIG. 1, an axially forward facing contact face 19 of body 11 is positioned in contact with an axially rearward facing contact face 21 of head 12. In particular, a channel (alternatively termed groove, recess or partial-cavity) is axially recessed into the axially forward facing contact face 19 of body 11 so as to at least partially accommodate an axially rearward portion of clamping element 13. Similarly, a corresponding channel (alternatively termed groove, recess, or partial-cavity) is recessed axially into rearward facing contact face 21 of head 12 so as to partially accommodate an axially forward portion of clamping element 13. With body 11 and head 12 assembled together as illustrated in FIG. 1, the corresponding channels 20, 22 align in a circumferential direction around axis 16 to define a slot within which is housed clamping element 13 that, in turn, is secured in a fully mated position by fixation element 14.

Figure 3:
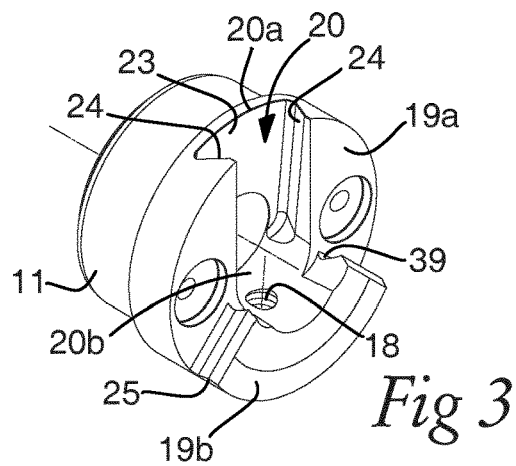
FIG. 3 is an upper end perspective view of a body part of the assembly of FIG. 1.
Figure 3A:
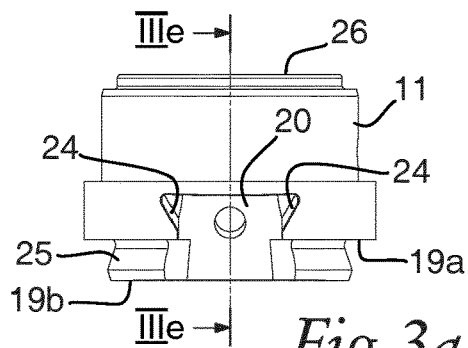
FIG. 3*a* is a side perspective view of the body of FIG. 3.
Figure 3B:
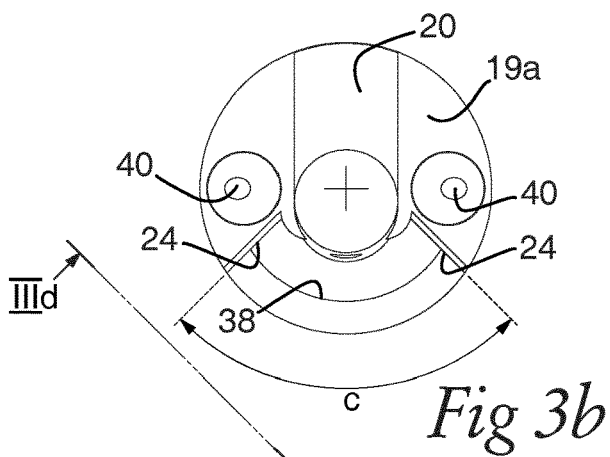
FIG. 3*b* is a plan view of the body of FIG. 3.
Figure 3C:
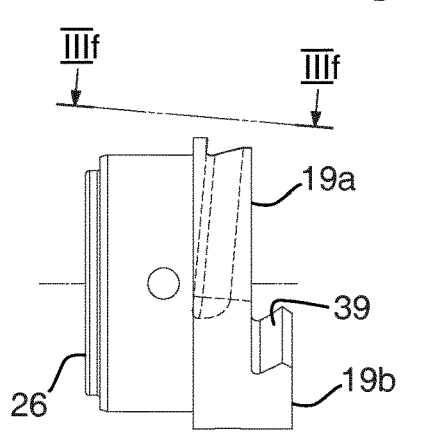
FIG. 3*c* is a further side view of the body of FIG. 3.
Figure 3D:
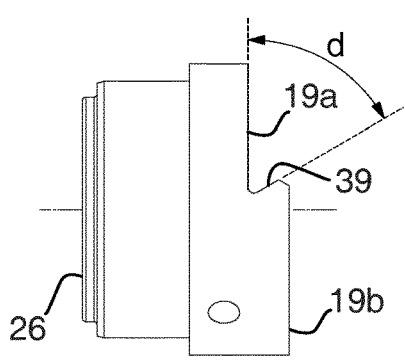
FIG. 3*d* is a side view along IIId-IIId of the body of FIG. 3*b*.
Figure 3E:
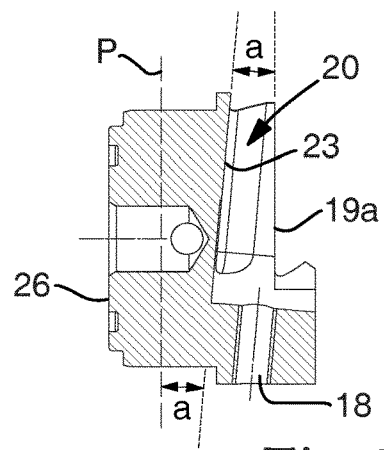
FIG. 3*e* is a cross sectional view through IIIe-IIIe of FIG. 3*a*.

Referring to FIGS. 2a and 2b, channel 20 (recessed from contact face 19) is defined, in part, by a base surface 23 and a pair of opposed side wall faces 24. Referring to FIG. 3, channel 20 is open at a radially outer or perimeter end 20a and extends up to and beyond the axial centre of body 11 (a short distance beyond axis 16) to terminate at a second radially inner end 20b. Referring to FIG. 3e base surface 23 is aligned oblique to a plane P orientated perpendicular to axis 16 with plane P also aligned parallel to contact faces 19 and 21. The angled or inclined orientation of base surface 23 accordingly provides a guide surface for radial sliding movement of clamping element 13 within channel 20. In particular, via base surface 23, clamping element 13 is guided to move radially inward from the channel peripheral end 20a to the channel radially inner end 20b along a declined axially rearward path.

Body contact face 19 is divided by channel 20 into a pair of flanking contact faces 19a (positioned either side of the channel 20) and a raised primary contact face 19b being axially forward of the pair of flanking contact faces 19a. In particular, body 11 comprises an arcuate shoulder portion 25 being a raised projection extending from the flanking contact faces 19a at a position around the radially inner end 20b of channel 20 referring to FIGS. 2a and 3. Referring to FIG. 3b, contact face 19b at shoulder 25 comprises an axial step 38 such that a radially outer portion of face 19b is axially forward relative to a radially inner portion of face 19b. This ensures the radially outer perimeter part of contact face 19b is positioned in contact with and against a corresponding portion of contact face 21 at head 12. Referring to FIGS. 3 to 3d, shoulder portion 25 projects axially forward from the flanking contact faces 19a at a perimeter of body 11 and is in part defined by a pair of end faces 39. End faces 39 are aligned to define an undercut (or overhang) region at the lengthwise ends of shoulder 25. Referring to FIG. 3b, an angular length c of shoulder portion 25 (about axis 16) is in a range 80 to 100° and is preferably 90°. Referring to FIGS. 2a and 3, a bore 18 extends radially through shoulder portion 25 and is generally coaxially aligned with base surface 23. That is, bore 18 extends into body 11 from the radially inner end 20b of channel 20. Threads 18b are provided at bore 18.

Referring to FIGS. 2a, 2b, 5a to 5d, fixation element 14 is elongate and is formed as a pin or rod provided with oppositely directed (left and right handed) threads 14a, 14b at each axial ends. Threads 14a are complementary with threads 17b, provided at bore 17 of clamping element 13, and threads 14b are complementary with threads 18b, provided at bore 18 within body 11.

A pair of fluid axially recessed delivery ports 40 are positioned at the respective flanking contact faces 19a to allow delivery of a lubricating/cooling fluid to the cutting head 12 and optionally cutting insert 15. Optionally according to further embodiments, the axially recessed delivery ports 40 may instead be configured with sensors such as temperature, movement, positional, alignment sensors and the like.

Referring to FIG. 3d, and in an axial plane through axis 16, an angle d between each shoulder end face 39 and each flanking contact face 19a is in a range 55 to 65° and is preferably 60°. This configuration is advantageous to provide the desired contribution to the clamping force by which head 12 is secured to body 11 via clamping element 13 (and indirectly via fixation element 14). The configuration of the shoulder portion 25 including end faces 39 having the respective angular length c and angled uncut orientation d, further provides the desired transfer of loading forces between head 12 and body 11 in addition to contributing to the axial and radial clamping between head 12 and body 11.

Figure 3F:
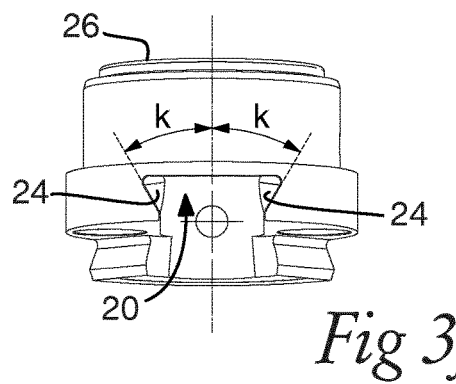
FIG. 3*f* is a side view along IIIf-IIIf of the body of FIG. 3*c*.

Referring to FIGS. 2a, 2b and 3f, the channel side wall faces 24 are orientated within body 11 so as to be undercut in an axial plane extending through axis 16 and orientated perpendicular to the radial length of channel 20 extending between perimeter and radially inner ends 20a, 20b. That is, each of the side wall faces 24 are at least partially axially rearward facing towards a rearward facing mount surface 26 positioned at an opposite end of body 11 relative to the axially forward facing contact face 19. In an axial plane, extending through axis 16, an angle k between each one of the axially rearward facing side wall faces 24 and the axis 16 is in a range 25 to 35° and is preferably 30° (representing the angular rearward orientation of the faces 24 relative to axis 16). Accordingly, a width (in a circumferential direction about axis 16) of channel 20 as defined between side wall faces 24 increases from an axial position of the forward facing contact face 19 to the rearwardmost portion of channel 20 defined by base surface 23. Accordingly, the cross sectional profile of channel 20 in a plane perpendicular to the length of channel between ends 20a, 20b is trapezoidal (i.e. dove-tail shaped) along the length of channel 20 between ends 20a, 20b.

Referring to FIGS. 3 and 3e, channel base surface 23 is angled (alternatively termed slowing or declined) at an angle a relative to plane P (aligned perpendicular to axis 16) and contact face 19 where angle a is in a range 2 to 8° and preferably 4 to 6°. Accordingly, in the axial direction, a depth of channel 20 from peripheral end 20a to radially inner end 20b increases (via the sloping base surface 23). Accordingly, clamping element 13 when slid radially within channel 20 is caused to move axially rearward in a direction away from contact face 19 and towards the axially rearward facing mount surface 26.

Figure 4:
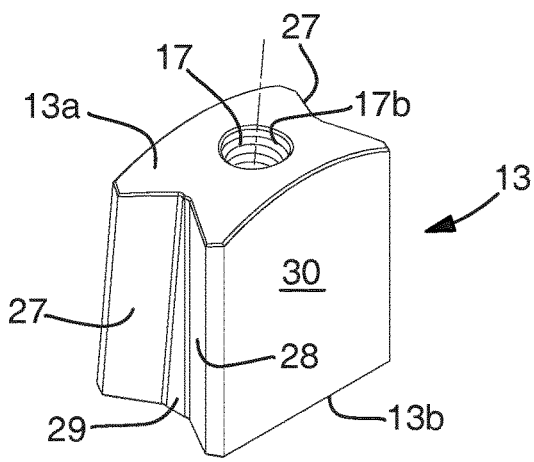
FIG. 4 is a perspective view of a clamping element to releasably couple the body part of FIG. 3 to a cutting head within the assembly of FIG. 1.
Figure 4A:
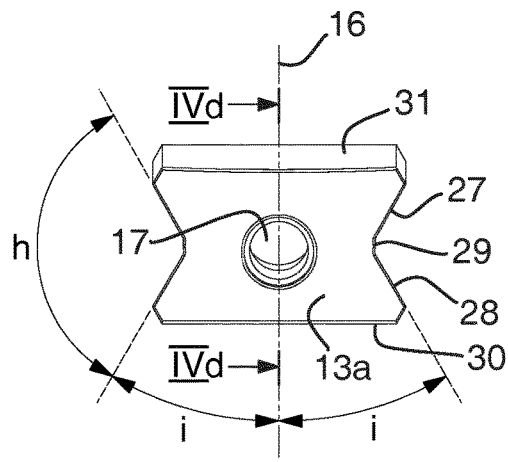
FIG. 4*a* is an end perspective view of the clamping element of FIG. 4.
Figure 4B:
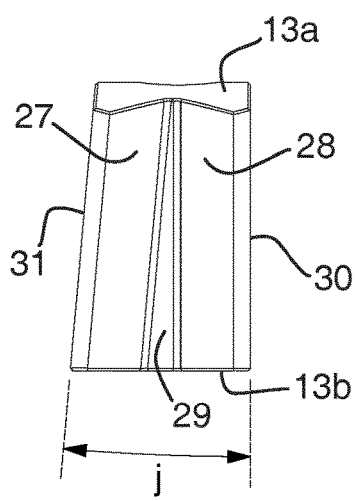
FIG. 4*b* is a side perspective view of the clamping element of FIG. 4.
Figure 4C:
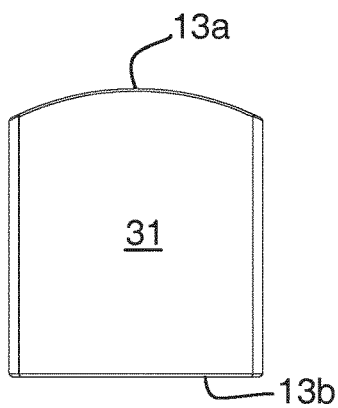
FIG. 4*c* is a plan view of the clamping element of FIG. 4.
Figure 4D:
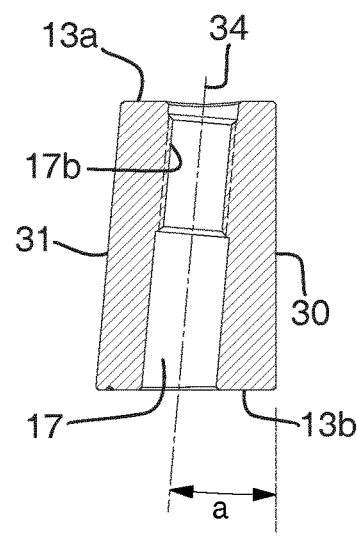
FIG. 4*d* is a cross sectional view through IVd-IVd of FIG. 4*a*.
Figure 5A:
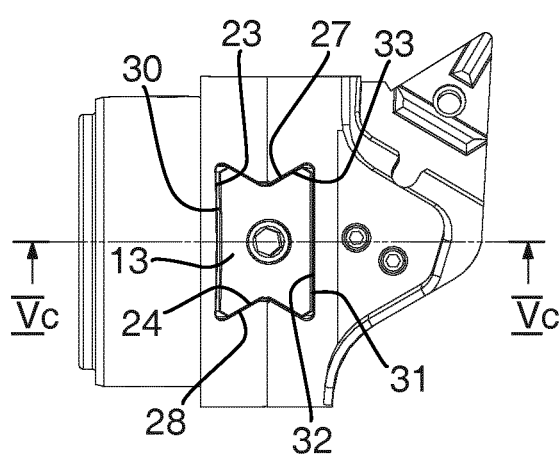
FIG. 5*a* is a perspective side view of the assembly of FIG. 1.
Figure 5B:
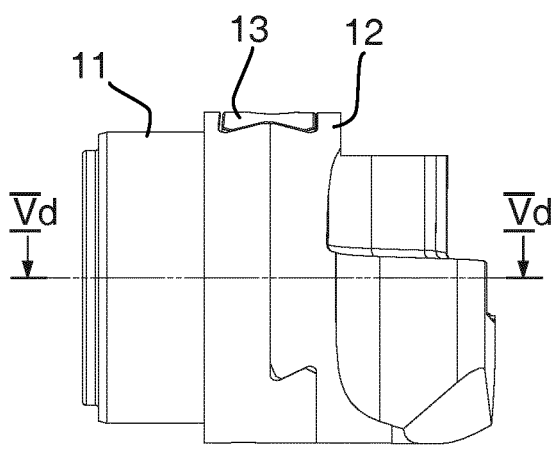
FIG. 5*b* is a further side perspective view of the assembly of FIG. 1.
Figure 5C:
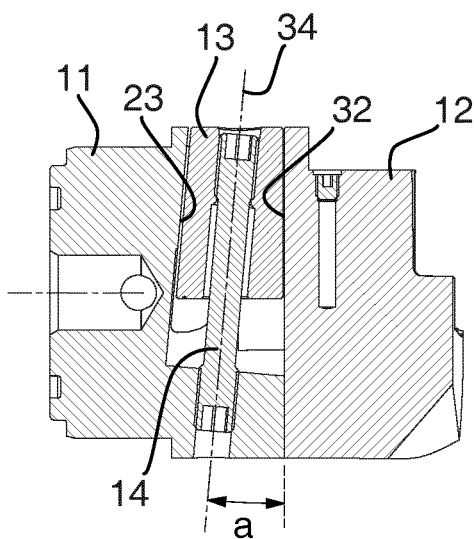
FIG. 5*c* is a cross sectional view through Vc-Vc of FIG. 5*a*.
Figure 5D:
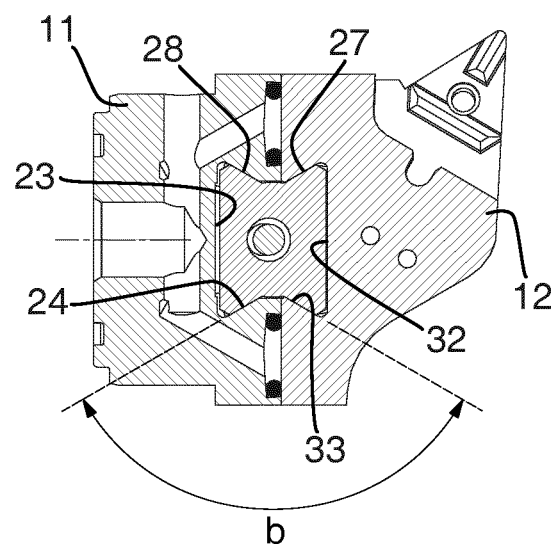
FIG. 5*d* is a cross sectional view through Vd-Vd of FIG. 5*b*.

Referring to FIGS. 4 to 4d, the wedge-shaped clamping element 13 comprises a through-bore 17 extending generally centrally through the body of clamping element 13 between a first peripheral end 13a and a second radially inner end 13b. Accordingly, bore 17 extends lengthwise through clamping element 13 between ends 13a, 13b. Bore 17 comprises threads 17b provided at and towards peripheral end 13a. Clamping element 13 comprises a planar axially forward facing surface 31 for positioning opposed to head 12 and corresponding planar axially rearward facing surface 30 for positioning opposed to body 11. In an axial plane extending through axis 16, an angle j between the forward facing and rearward facing surfaces 31, 30 is in a range 2 to 8° and preferably 4 to 6° to correspond to angle a. Accordingly, clamping element 13 comprises a height extending in the axial direction that increases from peripheral end 13a to radially inner end 13b. Through bore 17 (having longitudinal axis 34) is aligned parallel with forward facing surface 31 such that the bore axis 34 and rearward facing surface 30 are parallel to one another and oblique to the rearward facing surface 30 (at the angle a).

Clamping element 13 is also defined by lengthwise extending side faces (extending between ends 13a, 13b) that are divided into three sub-faces 27, 28 and 29. Faces 27, 28 and 29 are aligned oblique relative to one another at each lengthwise side of clamping element 13. In particular, side faces 27, 28 represent respective abutment faces of clamping element 13 to make contact with the respective portions of the head 12 and body 11. Referring to FIG. 4a, and in a plane perpendicular to a main length of clamping element, between ends 13a, 13b, abutment faces 27, 28 are obtuse relative to one another at an angle h in a range 110 to 130° and preferably 120°. Side face 29 is positioned at the mid-height region and at the junction between clamping faces 27 and 28. Due to the angled alignment of the forward and rearward facing surfaces 30 and 31, side face 29 has n irregular parallelogram shape profile between clamping faces 27, 28. With clamping element 13 mounted in position at body 11 (at least partially within channel 20), each of the pair of clamping side faces 28 are at least partially axially forward facing towards head 12 whilst the opposite pair of clamping side faces 27 are at least partially axially rearward facing towards body 11. An angle i between each one of the respective forward and rearward facing side face 28, 27, relative to the axis 16 is in a range 20 to 40°, 25 to 35° and preferably 30° as illustrated in FIG. 4a.

Channel 22, recessed axially into head 12 is, in part, defined by a corresponding base surface 32 which is axially rearward facing and co-planar with head rearward facing contact face 21 and body forward facing contact face 19. Channel 22 is further defined, in part by side wall faces 33 which, like body side wall faces 24 are undercut into head 12 at an angle corresponding to angle k as described referring to FIG. 3f. Accordingly, cutting head channel 22 comprises a cross sectional shape profile (in a plane perpendicular to a radial length of channel 22) that is also trapezoidal (dove-tail shaped) being an effective mirror image of channel 20 extending radially and recessed axially within body 11. However, an axial depth of head channel 22 is uniform along its radial length in contrast to body channel 20. Accordingly, clamping element 13 via the respective side wall faces 27, 28, 29 comprises a corresponding double dove-tail shape profile (in a plane perpendicular to the radial length of clamping element 13, between ends 13a, 13b) such that clamping element 13 comprises a complementary cross sectional shape profile to mate in close and near touching contact with the respective surfaces 23, 24 and 32, 33 that define each respective channel 20, 22 within the respective body 11 and head 12. In particular, the axially forward facing clamping side faces 28 are configured to frictionally engage the axially rearward facing side wall faces 24 at body 11 and the axially rearward facing clamping side faces 27 of clamping element 13 are configured to frictionally engage the complementary aligned axially forward facing side wall faces 33 of head 12 with the clamping element 13 located within the slot defined collectively by each respective channel 20, 22 as illustrated in FIGS. 1 and 5a to 5d.

Figure 6:
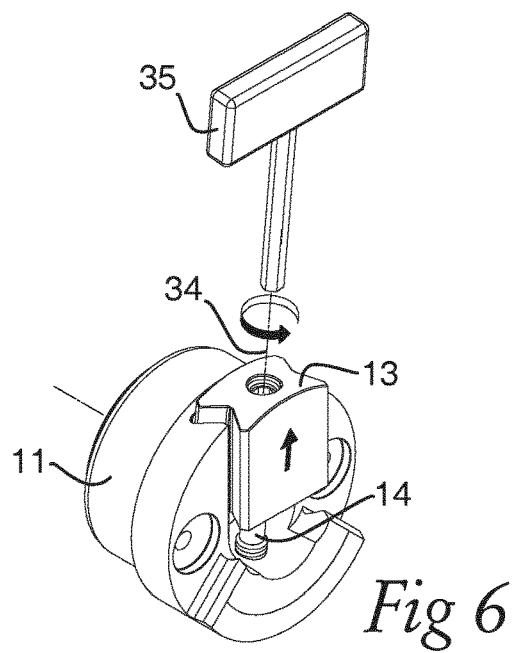
FIG. 6 is a perspective view of the body part of FIG. 3 and the clamping element of FIG. 4 forming a part of the assembly of FIG. 1.
Figure 6A:
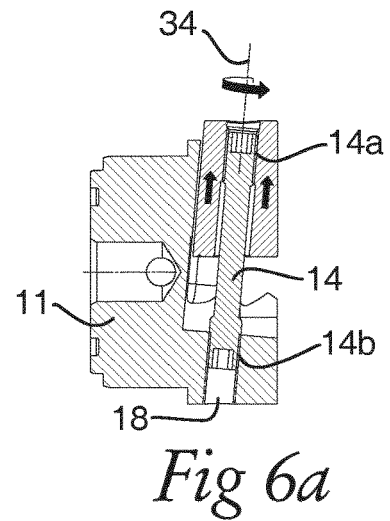
FIG. 6*a* is a cross sectional view through the part assembly of FIG. 6.
Figure 6B:
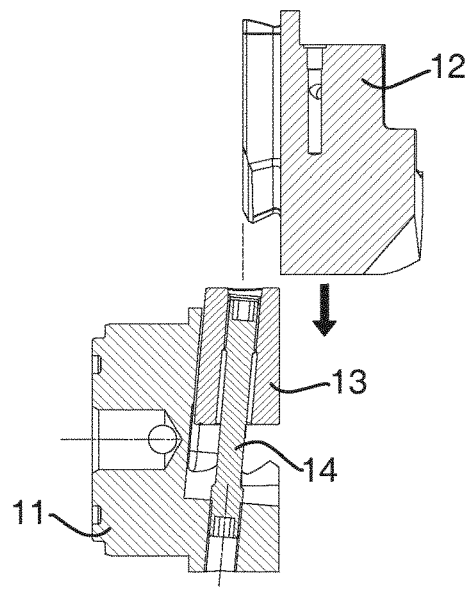
FIG. 6*b* is a further cross sectional view of the part assembly of FIG. 6*a* further including a cutting head prior to coupling.
Figure 6C:
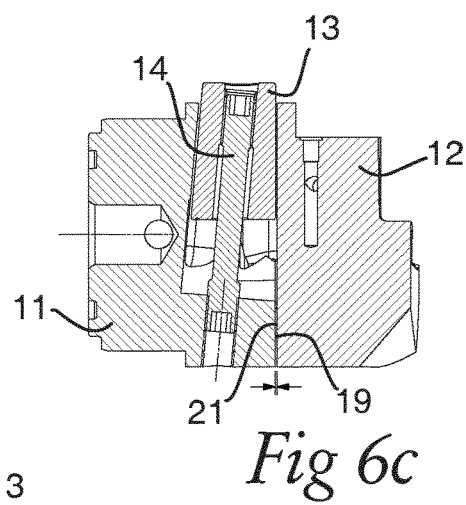
FIG. 6*c* is a cross sectional view through the assembly of FIG. 1 prior to and full assembly.
Figure 6D:
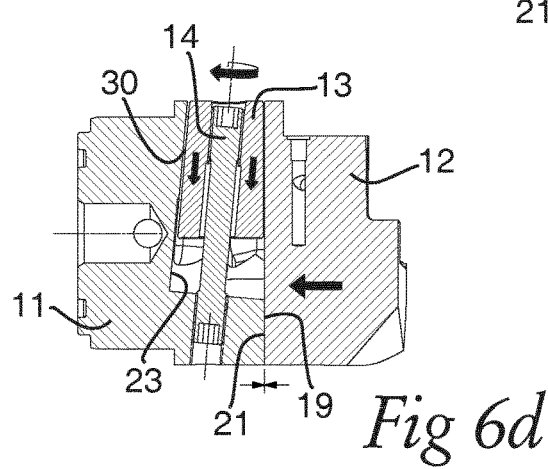
FIG. 6*d* is a cross section through the assembly of FIG. 1 in a fully clamped and assembled configuration.

The steps of clamping together the components of the assembly 10 are described referring to FIGS. 6 to 6d. Fixation element 14 is initially mounted into the bore 17 of clamping element 13 such that threaded end 14a engages threads 17b using a suitable hex tool 35. The partially assembled clamping element 13 and fixation element 14 are then introduced to the body 11 by sliding clamping element 13 into channel 20 such that threaded end 14b of fixation element 14 is introduced into bore 18 as illustrated in FIG. 6a. Referring to FIG. 6b, head 14 is then mated onto body 11 via engagement between contact faces 19 and 21 and the partial accommodation of clamping element 13 within channel 22 until head 12 lands against body 11 as illustrated in FIG. 6c. Fixation element 14 is then rotated via hex tool 35. Via the operating threads 14a, 17b and 14b, 18b clamping element 13 is forced radially inward and axially rearward along guide surface 23 towards channel radially inner end 20b such that in the final fully mated position of FIG. 6d, the peripheral end 13a of clamping element 13 is flush with the generally cylindrical outer surface of body 11.

As clamping element 13 is caused to displace axially rearward as it moves radially inward from channel end 20a towards channel end 20b, clamping element faces 27 are forced axially against channel side wall faces 24. Similarly, clamping element side faces 28 are forced axially against channel side wall faces 33 at head 12. In turn, clamping element 13 is deformed elastically under tension which forces head 12 into axial clamping contact against body 11. According to the preferred embodiment, a small clearance is provided (via the respective dimensions of clamping element 13 and channels 20, 22) between the opposed surfaces 30, 31 (of clamping element 13) and surfaces 23, 32 (of the respective channels 20, 22 within the body 11 and head 12). This respective clearance provides that appropriate frictional contact is made between the respective side faces 27, 28 and channel side wall faces 24, 33. Accordingly, head 12 is forced and clamped against body 11 primarily via the frictional contact and abutment between faces 27 and 33 and 28 and 24 which represents the primary regions of contact.

The sliding action of the wedge-shaped clamping element 13 within the respective channels 20, 22 (via rotation of fixation element 14 by hex tool 35) provides a simple convenient and quick mechanism for the assembly and clamping of head 12 at body 11. The inclined (undercut) faces 27, 28, 24 and 33 at the respective angles k, h, i and b are configured specifically to achieve the desired frictional contact and partial elastic deformation of clamping element 13 and accordingly the secure axial clamping of head 12 and body 11 during cutting. Contact between the axially forward and rearward facing faces 19, 21 is secondary, with primary contact provided between the faces 27, 28 of clamping element 13 and the side wall faces 24, 33 of the body 11 and head 12. In particular, with the clamping element 13 at the pre-fully clamped position of FIG. 6c, a small clearance is provided between the respective contact faces 19, 21 so as to ensure full contact between the clamping element 13 and the faces 24, 33 at the body 11 and head 12. The right and left handed threads 14a, 14b at fixation element 14 are advantageous (when cooperating with the corresponding threads 17b, 18b) to displace clamping element 13 radially within the slot defined by channels 20, 22 and to ensure the fixation element 13 does not project radially beyond clamping element 13 when in the fully clamped position of FIG. 6d. The opposite and dual threaded ends 14a, 14b are affective to provide a dual tightening of the fixation element 14 at both the clamping element 13 and the body 11 via a single rotation by tool 35 as illustrated in FIGS. 6 to 6d.

Shoulder portion 25 and the respective contact face 19b, step 38 and end faces 39 (including their respective angular configuration referring to angles c and d) contribute to the centering of the cutting head 12 at body 11 in addition to contributing to the axial locking of head 12 and body 11 specifically via the inclination of faces 39 and the contact with corresponding undercut faces 41 at head 12 (ending radially outward from a radially inner end of channel 22).

Figure 7A:
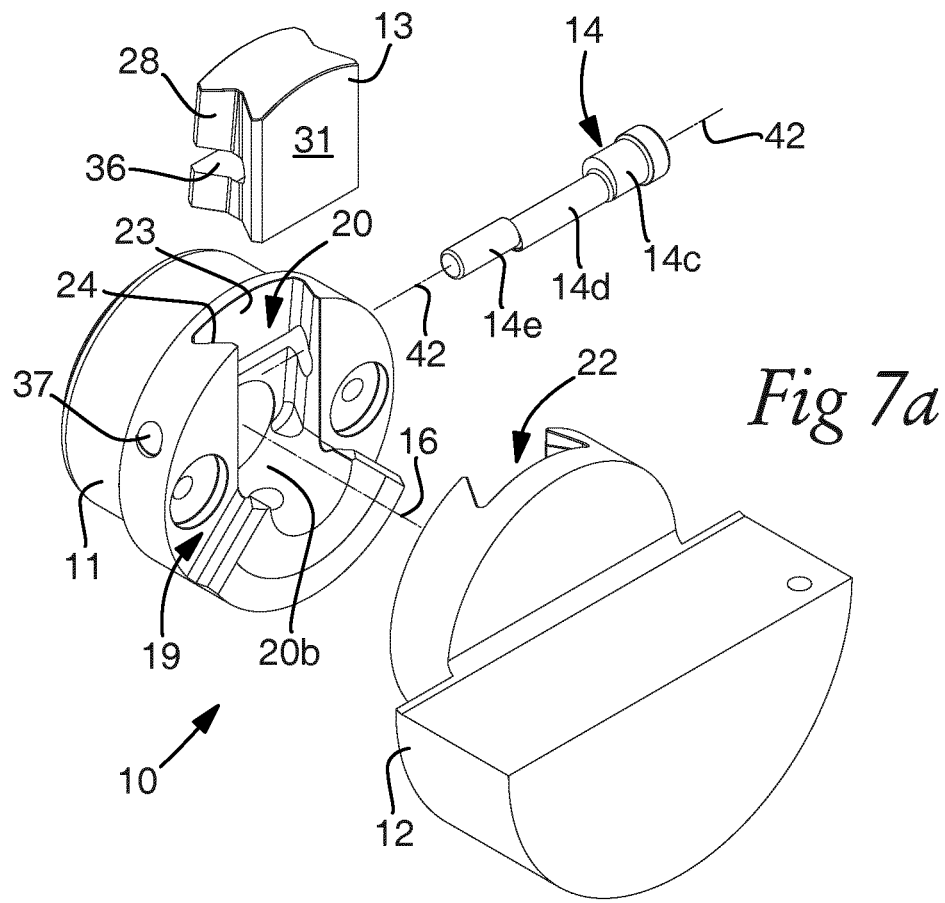
FIG. 7*a* is an exploded view of a cutting tool assembly according to a further embodiment of the present invention.
Figure 7B:
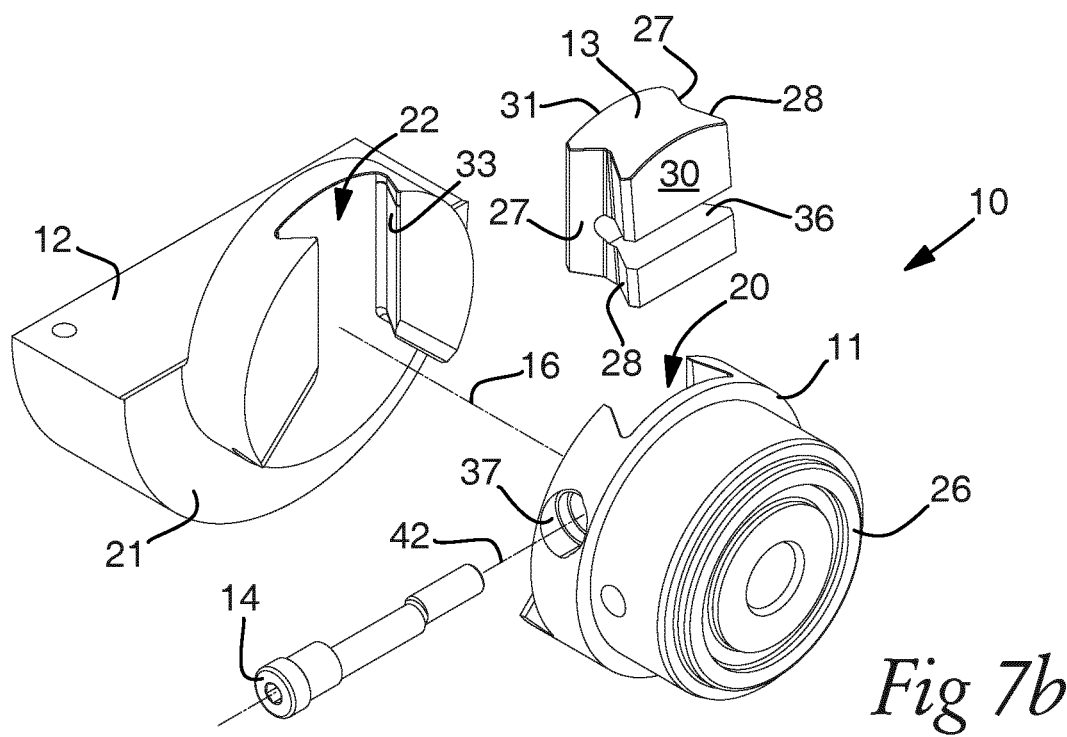
FIG. 7*b* is a further exploded perspective view of the assembly of FIG. 7*a*.

A further embodiment of the cutting head assembly 10 is described referring to FIGS. 7a to 8b. The majority of the components, features and functionality of the embodiment described referring to FIGS. 1 to 6d are common to the further embodiment of FIGS. 7a to 8b with the exception of the fixation element 14, the orientation of the bore 18 extending within head 12 and the bore 17 extending within clamping element 13. Referring to FIGS. 7a and 7b, the elongate fixation element 14 is divided axially into three sections including a first and second end 14c, 14e and a middle section 14d. Relative to a longitudinal axis 42, extending through fixation element 14, central section 14d is aligned eccentric whilst ends 14c, 14e are centred on axis 42. Second end 14e comprises threads to be complementary and to cooperate with corresponding threads provided at a bore 37 extending through body 11 in a direction perpendicular to a length of channel 20 (extending radially between peripheral end 20a and radially inner end 20b). Fixation element 14 is capable of being inserted and rotated within bore 37 (that extends through body 11 either side of channel 20) such that by cooperation of the threads, fixation element 14 is drawn into the bore 37. As will be appreciated, rotation of the fixation element 14 provides an eccentric displacement of the central section 14d relative to rotational axis 42 with the fixation element 14 mounted within bore 37 and extending perpendicular to the channel 20.

Clamping element 13 comprises the same components, features and general three-dimensional shape profile as described referring to FIGS. 4 to 4d including surfaces 30, 31 and the respective clamping faces 27 and 28. However, in place of bore 17, clamping element 13 comprises a slot 36 extending widthwise across clamping element 13 between lengthwise extending side faces 28 and recessed from the planar axially rearward facing surface 30 (with respect to axis 16). Accordingly, with clamping element 13 located at least partially within channel 20 and moved radially inward towards channel radially inner end 20b, slot 36 is aligned with bore 37 to accommodate fixation element central section 14d as it extends widthwise across channel 20. Accordingly, rotation of fixation element 14 about axis 42 (and the corresponding eccentric displacement of central section 14d) via abutment within slot 36, forces clamping element 13 to move radially within channel 20.

Figure 8:
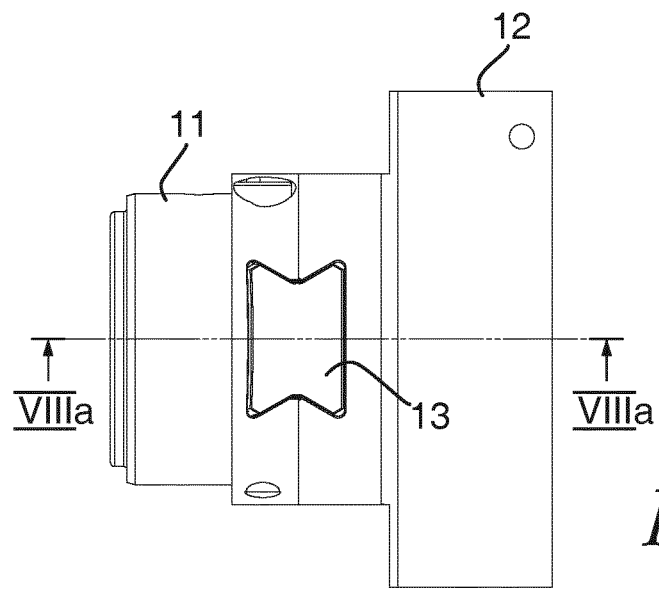
FIG. 8 is a side perspective view of the assembly of FIG. 7*a* in a fully assembled and clamped configuration.
Figure 8A:
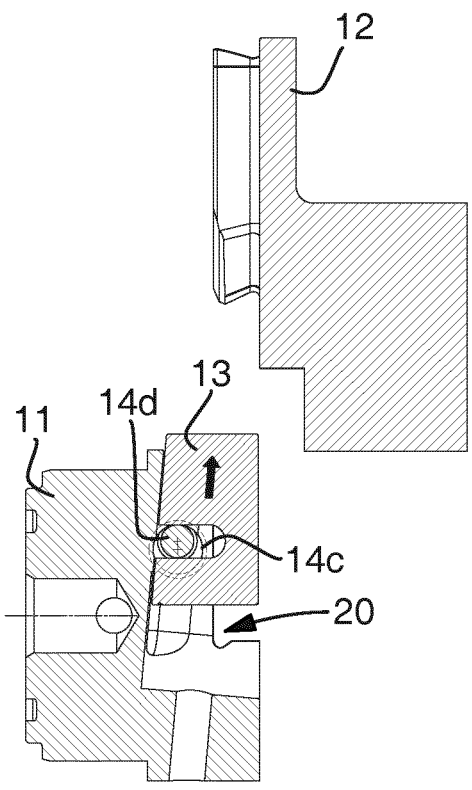
FIG. 8*a* is a cross sectional view through VIIIa-VIIIa of FIG. 8 prior to mating a cutting head at a body part.
Figure 8B:
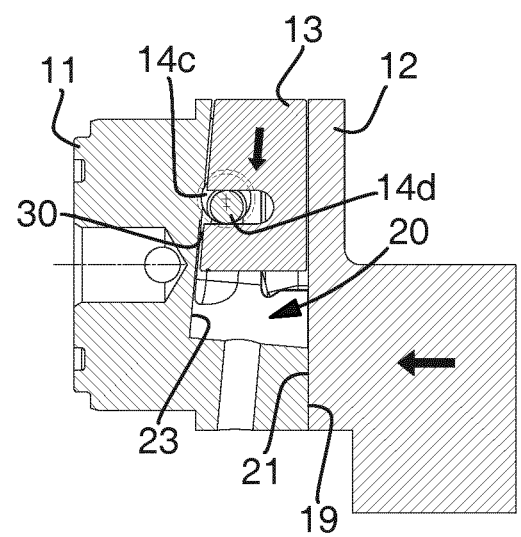
FIG. 8*b* is a cross sectional view through VIIIa-VIIIa of FIG. 8 with a cutting head and body part assembled in a final fully clamped and assembled configuration.

Referring to FIGS. 8 to 8a, during assembly, clamping element 13 is initially introduced into channel 20 so as to aligned slot 36 with bore 37. Fixation element 14 is then introduced into bore 37 to engage threaded end 14e with the corresponding threads at an axial end of bore 37. Cutting head 12 is then landed onto body 11 via engaging the axially rearward and forward contact faces 21, 19 of the head 12 and body 11, respectively. In this configuration, contact is made between the clamping faces 27, 28 of clamping element 13 and the respective side wall faces 24, 33 of the body 11 and head 12. Fixation element 14 is then rotated about axis 42 approximately 180° using tool 35 (FIG. 6). The eccentric central section 14b abuts clamping element 13 via slot 36 to force clamping element 13 radially inward towards channel end 20b. Via the inclined guide surface 23, clamping element 13 is displaced axially rearward which provides a corresponding axial displacement and clamping of the head 12 onto body 11 as illustrated in FIG. 8b via frictional contact between faces 27, 28 with faces 33 and 24, respectively.

Figure 9:
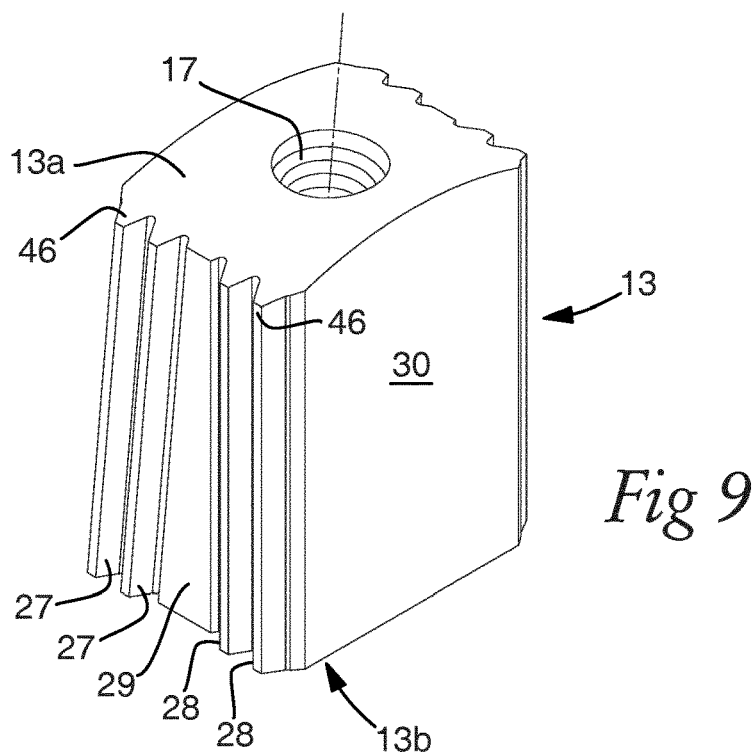
FIG. 9 is a perspective view of a clamping element according to a further embodiment of the present invention.

Referring to FIG. 9, a further embodiment of the clamping element 13 comprises the same features and configuration of the clamping element described with reference to FIGS. 1 to 8b with the exception of the side faces 27 and 28. According to the further embodiment, side faces (alternatively termed clamping faces) are formed by a plurality of elongate ribs 46 extending lengthwise along each lengthwise side of clamping element 13. In particular, a pair of ribs 46 extends axially above and below f the mid-height face 29 such that clamping element 13 comprises a plurality of ribs 46 extending lengthwise between ends 13a, 13b. Each rib comprises a respective axially rearward facing clamping face 27 and an axially forward facing clamping face 28 with the clamping element 13 located in position between body 11 and head 12 as illustrated in FIG. 1. Accordingly, the respective side faces 24, 33 that, in part, define each respective channel 20, 22 at the body 11 and head 12, respectively, are also divided by corresponding ribs (not shown) extending lengthwise along each side of each respective channel 20, 22. Accordingly, the axial clamping forces are distributed via the respective multiple clamping faces 27, 28 and the respective multiple side wall faces 24, 33.

The present invention has been described referring to FIGS. 1 to 8b within which a cutting head is axially coupled to body, the latter representing an axially forwardmost part of a cutting tool body. However, the present invention may be implemented as an assembly for coupling a first and second body part of a cutting tool in which the first and second body parts are mated by axially forward and rearward facing contact surfaces. In particular, the present invention may be utilised for the releasable axial clamping of an adaptor to a cutting tool body and/or a cutting head. Optionally, the adaptor may be a multi tool adaptor, a reduction adaptor, an adaptor for a specifically-shaped shank tool etc. Optionally, the present invention may be utilised for coupling multiple interfaces of an assembly with each respective interface (defined by respective contact faces) comprising the features as described with reference to FIGS. 1 to 8b including in particular the clamping element 13 and the associated channel, clamping and abutment faces (faces 23, 24, 27, 28, 32, 33).

Figure 10:
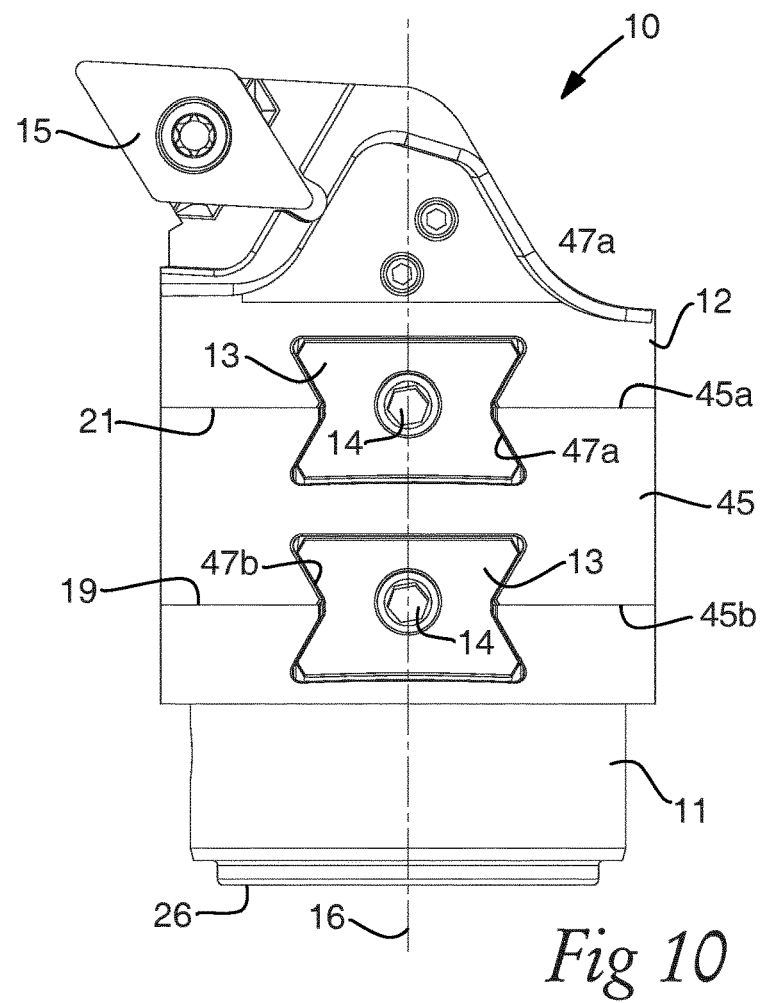
FIG. 10 a side perspective view of a cutting tool part assembly according to a further implementation comprising a tool body, a cutting head and an adaptor positioned axially intermediate the body and cutting head according to a further specific implementation of the present invention.

In particular, referring to FIG. 10, a cutting tool part assembly 10, comprises a body 11 representing an axially forward part of the tool body; at a cutting head 12 (carrying a cutting insert 15); and a generally disc-shaped adaptor 45, positioned axially intermediate head 12 and tool body 11. Adaptor 45 comprises an axially forward facing contact face 45a configured to mate with the axially rearward facing contact face 21 of head 12 and an opposite axially rearward facing contact face 45b configured to mate with the axially forward facing contact face 19 of body 11. A respective clamping element 13 and associated fixation element 14 is provided at the interface between the adaptor 45 and the respective cutting head 12 and body 11. The features of clamping and fixation elements 13, 14 and the associated interfaces at the head 12 and body 11 correspond to those described referring to FIGS. 1 to 9. Additionally, adaptor 45 comprises according to the specific implementation, an axially forward facing channel 47a and an axially rearward facing channel 47b recessed into each respective contact face 45a, 45b. As will be appreciated, channels 47a, 47b are configured to at least partially accommodate each respective clamping element 13 to provide the clamping abutment contact as described previously. According to further specific implementations, the present invention, comprising clamping element 13 and fixation element 14, may be provided at only one of the axial interfaces (19 and 45b) or (21 and 45a) as appropriate.

Figure 11A:
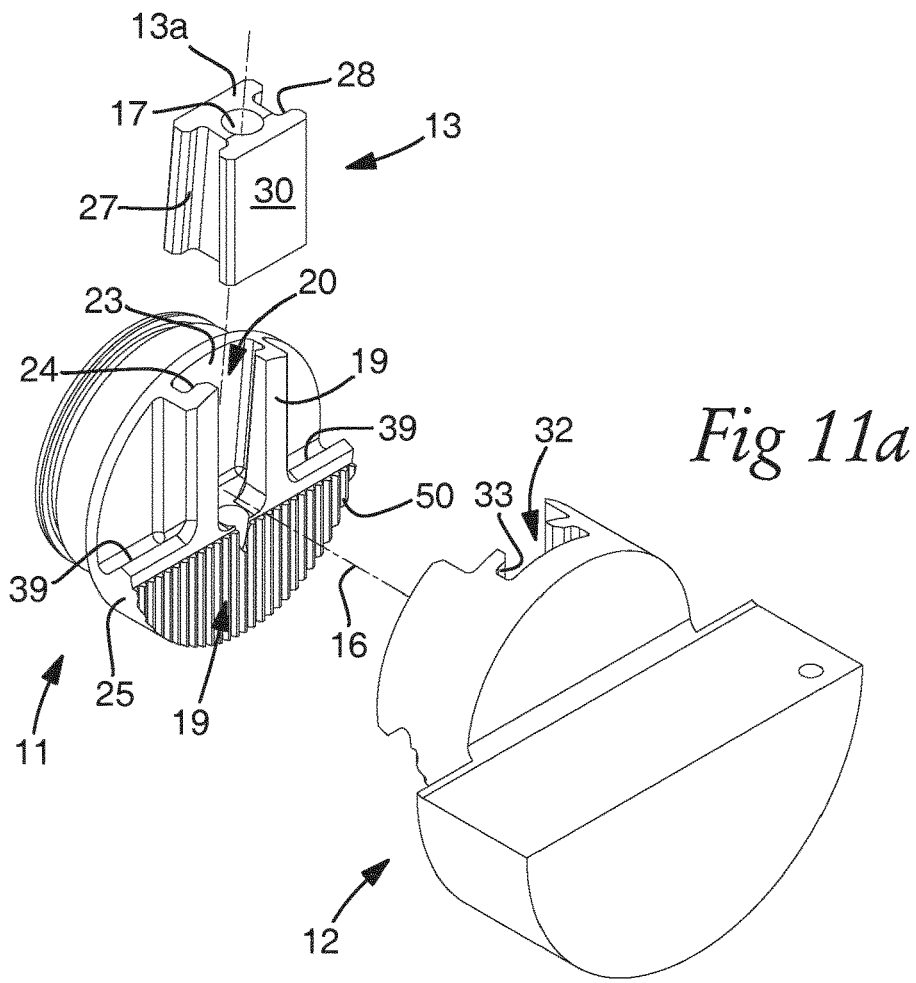
FIG. 11*a* is a first exploded perspective view of a cutting head assembly of a cutting tool according to a further embodiment of the present invention.
Figure 11B:
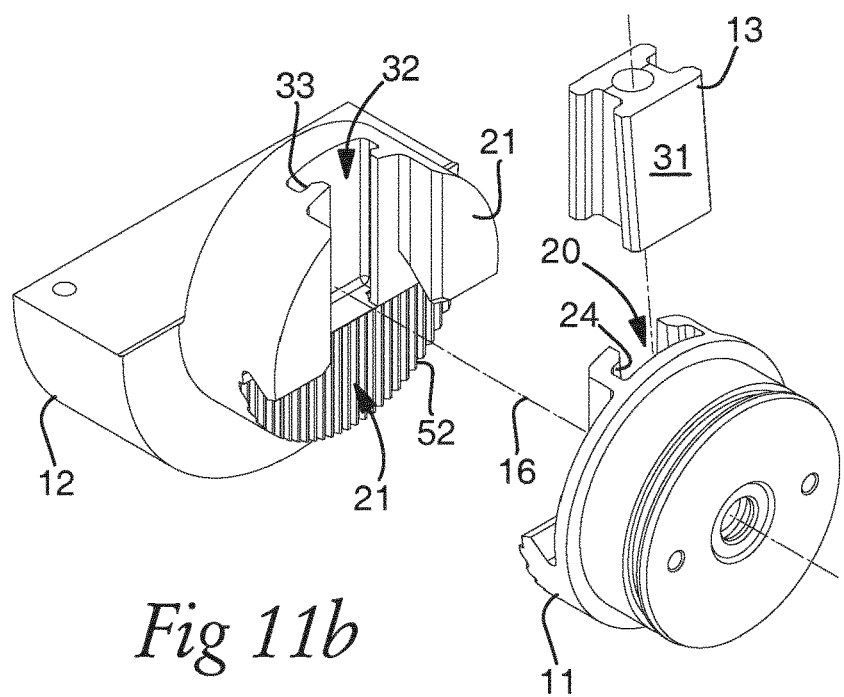
FIG. 11*b* is a further exploded perspective view of the assembly of FIG. 11*a*.

A further embodiment of the present invention is described referring to FIGS. 11a and 11b. According to the further embodiment, clamping element 13 comprises a generally H-(or I-) cross sectional shape profile. Clamping element 13 comprises the features as described referring to earlier embodiments including the axially rearward and forward facing surfaces 28, 27. The body 11 and head 12 also comprise generally the same features as described within the earlier embodiments including in particular channel 20 defined, in part, by side wall faces 24. According to the further embodiment, the shoulder portion 25, being raised axially forward relative to channel base surface 23 extends across contact surface 19 such that end faces 39 are aligned perpendicular to a main length of channel 20. Additionally, surface profiling, in the form of ribs 50, is provided at contact surface 19 at the axially raised portion of shoulder 25. Ribs 50 are configured to engage corresponding ribs 52 provided at the opposed contact surface 21 of head 12. As been noted from FIGS. 11a and 11b, the respective channels 20, 32 at the body 11 and head 12 are complementary with the generally H-shape profile of the clamping element 13 so as to provide abutment contact between the respective faces 27, 28, 24 and 33. Ribs 50, 52 act to increase the surface area contact between body 11 and head 12 and to provide increased resistance to independent rotation and accordingly increase the axial and radial locking forces between body 11 and head 12. According to the further embodiment, channel 20 at body 11 is defined in its lengthwise direction by a pair of channel walls 51 that extend radially across body 11 in a direction perpendicular to shoulder end faces 39.

Two further embodiments are described referring to FIGS. 12a, 12b and 13a, 13b. Both further embodiments comprise the clamping element 13 described with reference to FIG. 9 having ribs 46 extending lengthwise between ends 13a, 13b. Accordingly, body 11 and head 12 also comprise corresponding ribs 53, 55, respectively extending lengthwise along the side walls that define each respective channel 20, 32. Ribs 53, 55 accordingly comprise the respective side wall faces 24, 33 configured to abut the respective side faces 27, 28 of clamping element 13 (also defined by ribs 46).

As described referring to the further embodiment of FIGS. 11a and 11b, the respective contact surfaces 19, 21 of the body 11 and head 12 comprise ribs 50, 54, 56 and 57 configured to inter-engage one another as the body 11 and head 12 are axially clamped together so as to increase the frictional contact and the locking strength of the assembly. According to the further embodiment of FIGS. 12a and 12b, body 11 comprises ribs 50 at the raised contact surface 19 of shoulder 25 in addition to ribs 54 provided at contact surface 19 adjacent to either lateral side of channel 20. Ribs 54 are positioned towards the open entrance end of channel 20. Axially raised shoulder portion 25, as described referring to the embodiment of FIGS. 1 to 8a is generally arcuate and extends around the terminal end 20b of channel 20. Ribs 50 are positioned at a mid-length region of shoulder portion 25 between end faces 39. Ribs 50, 54 are all aligned generally parallel to one another and generally parallel with the length of channel 20. Referring to FIG. 12b, the ribs 56, 57 at head 12 are similarly aligned parallel to the length of channel 32. Additionally, ribs 56 are positioned to flank the lateral sides of channel 32 and extend towards its peripheral (radially outermost) open end 32a whilst ribs 57 are positioned adjacent the radially inner end of channel 32.

Figure 12A:
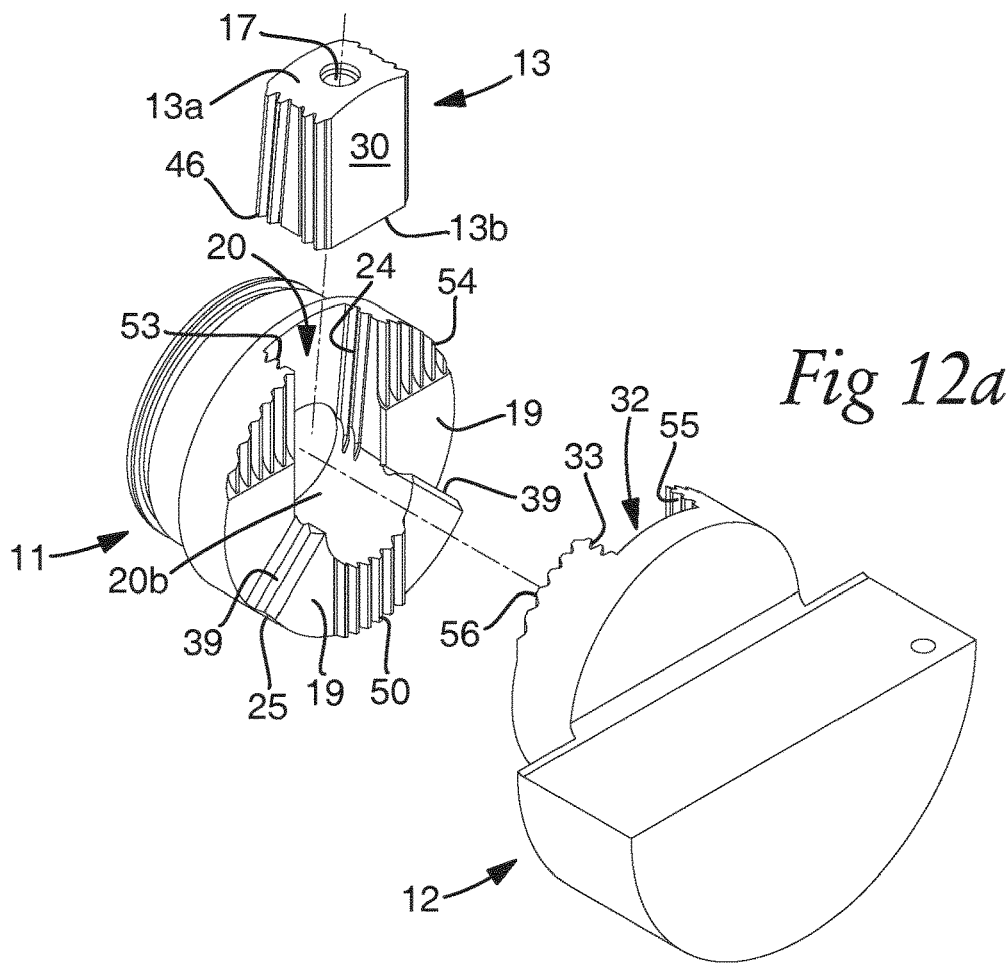
FIG. 12*a* is a first exploded perspective view of a cutting head assembly of a cutting tool according to a further embodiment of the present invention.
Figure 12B:
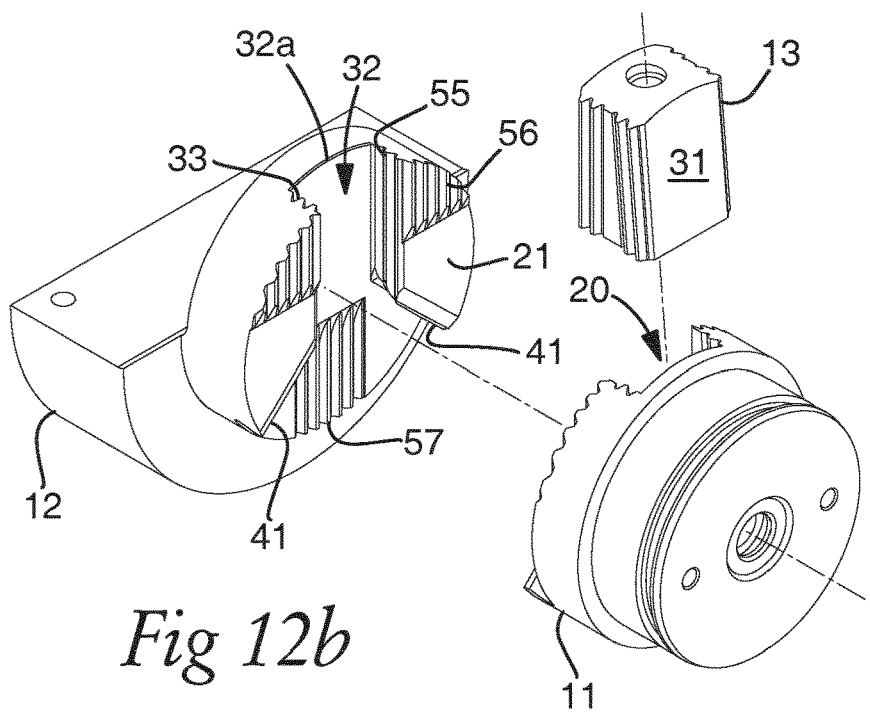
FIG. 12*b* is a further exploded perspective view of the assembly of FIG. 12*a*.
Figure 13A:
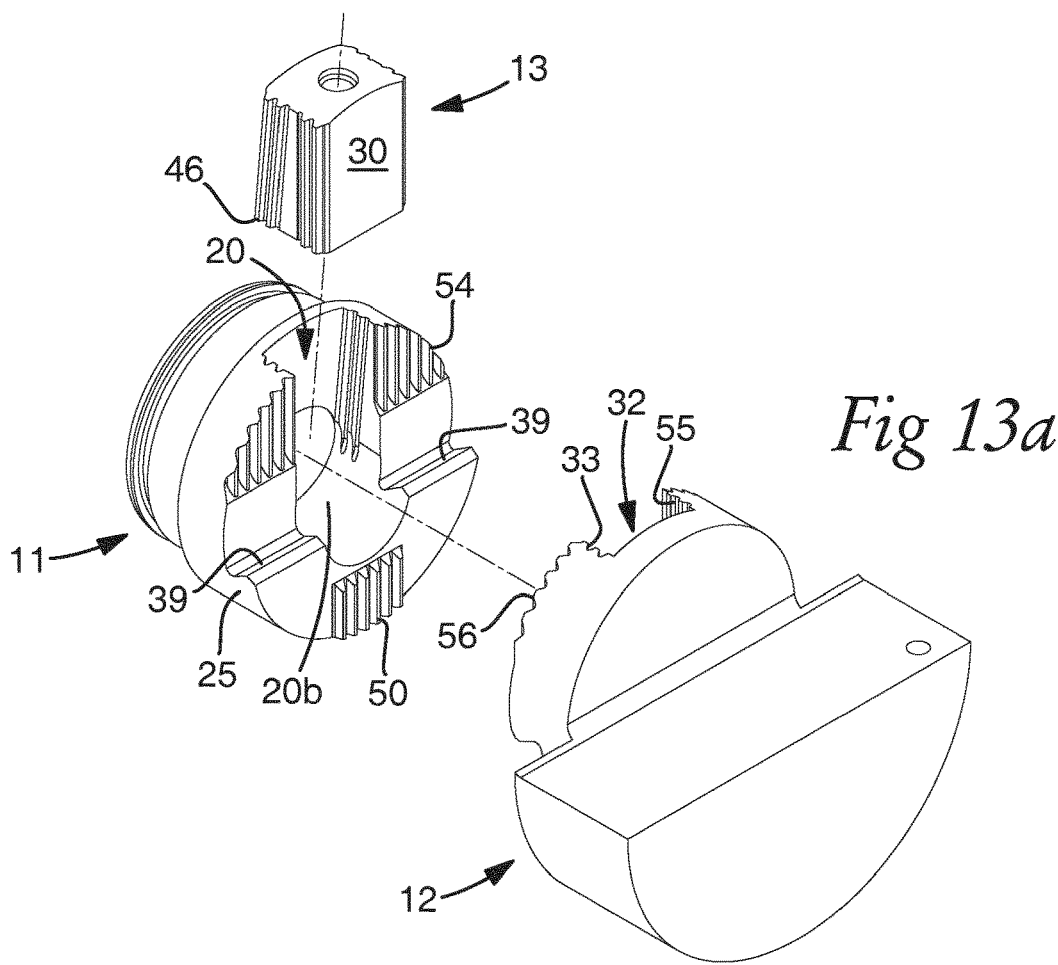
FIG. 13*a* is a first exploded perspective view of a cutting head assembly of a cutting tool according to a further embodiment of the present invention.
Figure 13B:
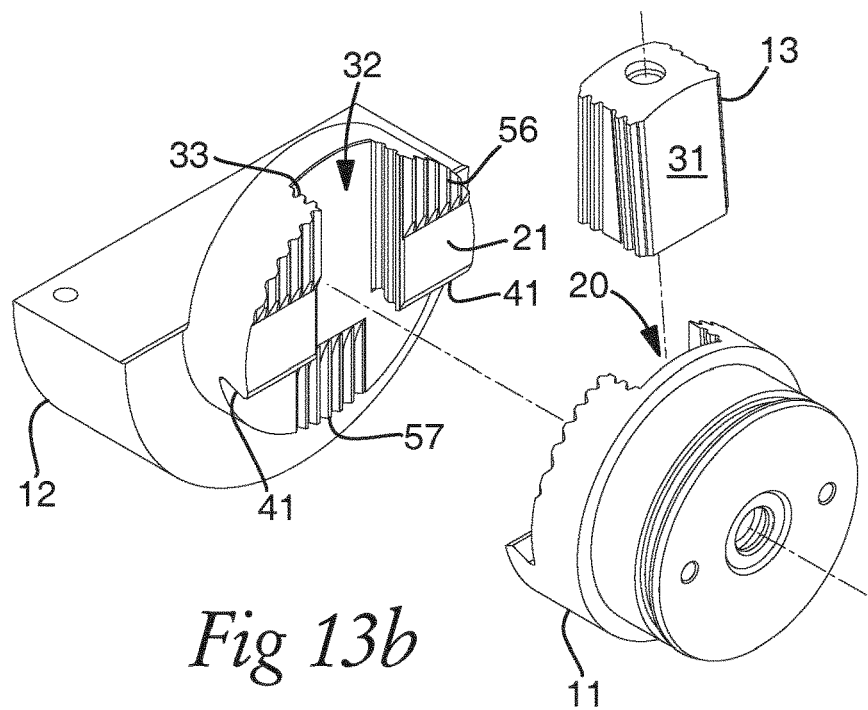
FIG. 13*b* is a further exploded perspective view of the assembly of FIG. 13*a*.

The further embodiment of FIGS. 13a and 13b corresponds almost identically to the embodiment of FIGS. 12a and 12b but differs via the configuration of the raised shoulder portion 25 having end faces 39 that are aligned generally perpendicular to the length of channel 20 (corresponding to the configuration of the embodiment of FIGS. 11a and 11b). The embodiment of FIGS. 13a, 13b also comprises the corresponding ribs 50, 54, 55, 56, 57 at body 11 and head 12 as described. Additionally, the clamping element 13 comprises the ribbed configuration (ribs 46) as described referring to FIGS. 9 and 12a, 12b.

The invention claimed is:

1. A cutting tool part assembly for a cutting tool, the assembly comprising:
a first body arranged to form an axially forward part of a cutting tool;
a clamping element movably mounted relative to the first body to a clamping position to releasably clamp a second body at the first body; and
a fixation element arranged to releasably lock the clamping element in the clamping position, wherein the first body includes an axially forward facing contact face arranged to mate with a corresponding axially rearward facing contact face of the second body, and at least one abutment face being at least partially rearward facing, the clamping element including at least one first clamp face being at least partially forward facing to mate with the abutment face and at least one second clamp face being at least partially axially rearward facing to mate with a portion of the second body, the first body including at least one guide surface extending in a radial direction and aligned oblique to a plane perpendicular to a longitudinal axis of the first body so as to also extend in an axial direction of the first body, the guide surface supporting movement of the clamping element in a radial and an axial direction via an actuation of the fixation element to force and clamp together axially the first body and the second body.

2. The assembly as claimed in claim 1, wherein the guide surface is located at the first body.

3. The assembly as claimed in claim 1, wherein the first body includes a channel having a length extending radially and a depth recessed axially from the contact face, the guide surface defining at least a part of the channel, wherein the clamping element is arranged to be at least partially accommodated and radially slidable within the channel.

4. The assembly as claimed in claim 3, wherein the guide surface forms a base surface of the channel, the channel being further defined by opposed side faces.

5. The assembly as claimed in claim 4, wherein the at least one abutment face includes at least portions of the opposed side faces.

6. The assembly as claimed in claim 1, wherein at least portions of respective contact faces extend in a plane generally perpendicular to the longitudinal axis of the first body and the abutment face and the first and second clamp faces are aligned oblique to the contact faces.

7. The assembly as claimed in claim 1, wherein in an axial plane extending through the first body and bisecting the longitudinal axis, the guide surface extends in a radial direction at an angle (a) relative to the plane perpendicular to the longitudinal axis of the first body in the range 0.5° to 10°; 1° to 9°; 1° to 8°; 1° to 7°; 3° to 7°; or 4° to 6°.

8. The assembly as claimed in claim 1, wherein in an axial plane extending through the first body and bisecting the longitudinal axis, each of the abutment face and the first clamp face are aligned at an angle in a range 10° to 50°; 15° to 45°; 20° to 40°; 25° to 35°; or 27° to 33° relative to said axial plane.

9. The assembly as claimed in claim 8, wherein in an axial plane extending through the first body and bisecting the longitudinal axis, an angle defined between the first and second clamp faces is in a range 100° to 140°; 105° to 135°; 110° to 130°; or 115° to 125°.

10. The assembly as claimed in claim 1, wherein the fixation element comprises a pin or screw adjustably mountable at the first body or the second body.

11. The assembly as claimed in claim 10, wherein the fixation element is coupled to the clamping element such that a positional adjustment of the fixation element relative to the first body and/or the second body provides the radial and axial movement of the clamping element along the guide surface.

12. The assembly as claimed in claim 10, wherein the fixation element is elongate having a length extending parallel or generally parallel or nearly parallel with a length of the clamping element that extends generally radially at the first body and/or the second body.

13. The assembly as claimed in claim 10, wherein the fixation element is elongate having a length extending perpendicular or generally perpendicular, or transverse to a length of the clamping element that extends generally radially at the first body and/or the second body.

14. The assembly as claimed in claim 10, wherein a length of the fixation element is aligned parallel or generally parallel with the guide surface extending in the radial direction.

15. The assembly as claimed in claim 1, wherein the clamping element includes a bore arranged to at least partially accommodate a first portion of the fixation element.

16. The assembly as claimed in claim 15, wherein the first body includes a radially extending bore arranged to at least partially accommodate a second portion of the fixation element.

17. The assembly as claimed in claim 16, wherein the fixation element includes first threads arranged at or towards a first axial end to mate and cooperate with first threads formed at the bore of the clamping element, and second threads formed at or towards a second axial end to mate and cooperate with second threads formed at the bore of the first body.

18. The assembly as claimed in claim 1, wherein at least a portion of the contact face of the first body is profiled and includes surface scoring, ridges, ribs or roughening.

19. The assembly as claimed in claim 1, wherein the second body is positioned axially forward of the first body and includes at least one abutment face being arranged at least partially axially forward facing to mate with the second clamp face being at least partially axially rearward facing.

20. The assembly as claimed in claim 19, wherein the second body includes a cutting head.

21. The assembly as claimed in claim 19, wherein the second body includes an adaptor, for positioning axially between a cutting head and the first body.

22. The assembly as claimed in claim 19, wherein the second body includes a cutting head and the first body includes an adaptor, the adaptor being mountable to an axially forward region of the cutting tool.

23. The assembly as claimed in claim 19, wherein at least a portion of the contact face of the second body is profiled and includes surface scoring, ridges, ribs or roughening.

* * * * *